United States Patent
Foster et al.

(10) Patent No.: US 11,987,453 B2
(45) Date of Patent: May 21, 2024

(54) DOLLY APPARATUSES INCLUDING SYNCHRONIZATION ARMS

(71) Applicant: Toyota Motor Engineering & Manufacturing North America, Inc., Plano, TX (US)

(72) Inventors: Scottie L. Foster, Lawrenceburg, KY (US); Bradley J. Garcia, Louisville, KY (US); Lloyd R. Holland, Georgetown, KY (US); Michael C. Greenlee, Paris, KY (US); Annetta L. Allen, Lexington, KY (US); Johnny O. Boarman, IV, Frankfort, KY (US); Jeffrey L. James, Mount Sterling, KY (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 86 days.

(21) Appl. No.: 17/736,617

(22) Filed: May 4, 2022

(65) Prior Publication Data

US 2023/0356961 A1 Nov. 9, 2023

(51) Int. Cl.
*B65G 47/50* (2006.01)
(52) U.S. Cl.
CPC .................... *B65G 47/50* (2013.01)
(58) Field of Classification Search
CPC .................................................... B65G 47/50
See application file for complete search history.

(56) References Cited

U.S. PATENT DOCUMENTS

| 8,166,634 B2 * | 5/2012 | Tohyama | B62D 65/12 |
| | | | 29/714 |
| 2008/0056871 A1 * | 3/2008 | Morgan | B62B 3/0643 |
| | | | 414/800 |

FOREIGN PATENT DOCUMENTS

| CN | 203740581 U | 7/2014 | |
| CN | 212475034 U | 2/2021 | |
| CN | 213483200 U | 6/2021 | |
| CN | 111361946 B | 7/2021 | |
| CN | 215205019 U | 12/2021 | |
| EP | 2371684 A2 * | 10/2011 | ............. A01N 35/02 |
| JP | 2015140064 A * | 8/2015 | |

* cited by examiner

*Primary Examiner* — William R Harp
(74) *Attorney, Agent, or Firm* — Dinsmore & Shohl LLP

(57) ABSTRACT

A method of automatically moving a dolly apparatus from an initial location to a downstream location is provided. The method includes engaging a component being carried along an elevated conveyor with a synchronization arm of a dolly apparatus such that the dolly apparatus moves with the component. The dolly apparatus includes a base frame and an actuation member movably mounted to the base frame. A synchronization arm is movably mounted to a top of the base frame. The actuation member is operatively connected to the synchronization arm such that actuating the actuation member lowers the synchronization arm to a disengaged position. The actuation member is actuated thereby lowering the synchronization arm to a disengaged position and releasing the component.

10 Claims, 1 Drawing Sheet

DOLLY APPARATUSES INCLUDING SYNCHRONIZATION ARMS

TECHNICAL FIELD

The present specification generally relates to dolly apparatuses for an assembly line and, more specifically, to dolly apparatuses that include synchronization arms for synchronizing movement with elevated conveyors.

BACKGROUND

Dolly apparatuses may be used on an assembly line, such as a vehicle assembly line. Dolly apparatuses are currently used that have a swing out arm that can reposition parts closer to their installation location as the vehicles move along the assembly line. These swing out arms may be manually moveable between an initial position and an installation position. After an installation process, the operator may need to move the swing out arm toward the initial position and away from the vehicle in order to avoid contact with the vehicle as the vehicle continues down the assembly line.

What is needed are dolly apparatuses that include a synchronization arm for synchronizing movement with an elevated conveyor.

SUMMARY

In one embodiment, a method of automatically moving a dolly apparatus from an initial location to a downstream location is provided. The method includes engaging a component being carried along an elevated conveyor with a synchronization arm of a dolly apparatus such that the dolly apparatus moves with the component. The dolly apparatus includes a base frame and an actuation member movably mounted to the base frame. A synchronization arm is movably mounted to a top of the base frame. The actuation member is operatively connected to the synchronization arm such that actuating the actuation member lowers the synchronization arm to a disengaged position. The actuation member is actuated thereby lowering the synchronization arm to a disengaged position and releasing the component.

In another embodiment, a dolly apparatus for use on an assembly line includes a base frame and an actuation member movably mounted to the base frame. A synchronization arm is movably mounted to a top of the base frame. The actuation member is operatively connected to the synchronization arm such that actuating the actuation member lowers the synchronization arm to a disengaged position and releasing the actuation member raises the synchronization arm to a synchronization position to synchronize with an overhead conveyor.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to dolly apparatuses with synchronization arms that synchronize with an overhead conveyor system to travel therewith in a conveying direction. The dolly apparatuses include a frame, an actuation member movably mounted to the frame and a synchronization arm that is movably mounted to a top of the frame. The actuation member is operatively connected to the synchronization arm such that actuating the actuation member lowers the synchronization arm to a disengaged position. Releasing the actuation member raises the synchronization arm to a synchronization position. A biasing member can bias the dolly apparatuses toward an initial location when the dolly apparatuses are in an assembly location.

The dolly apparatuses may be used on a vehicle assembly line, as an example. The dolly apparatus may be a wheeled device that is moveable along an elevated conveyor that conveys a vehicle part, such as a vehicle door assembly in a conveying direction. The dolly apparatus can synchronize with the vehicle part to move in the conveying direction with the vehicle part during an assembly process. Once the assembly process is complete, the dolly apparatus may be uncoupled from the elevated conveyor and then moved in an upstream direction past the vehicle part and toward a next vehicle part for another assembly process. The actuation member moves the synchronization arm between a synchronization position in a conveying path of the vehicle part and a disengaged position out of the conveying path of the vehicle part. Once the synchronization arm is lowered to the disengaged position, the biasing member can provide a biasing force that causes the dolly apparatus to move automatically upstream along the conveying path toward a next vehicle part once the synchronization arm is placed in the disengaged position.

Figure 1:
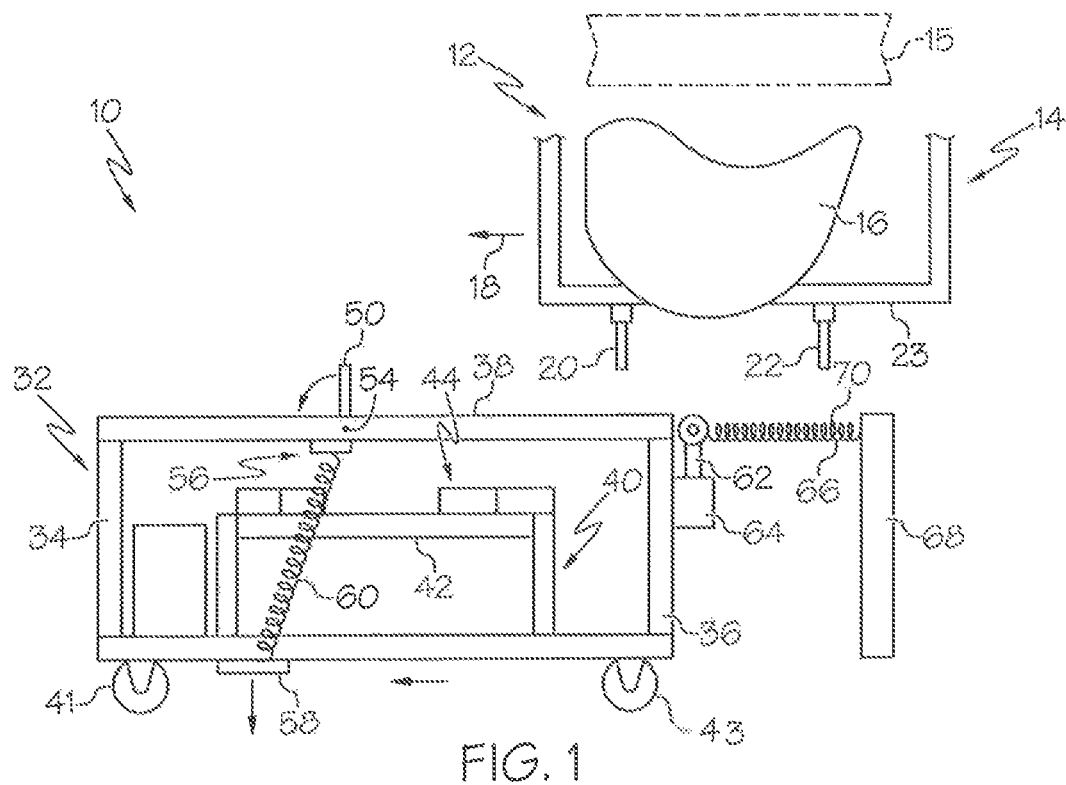
FIG. 1 is a diagrammatic view of a vehicle assembly line system including a dolly apparatus including a synchronization arm in a synchronization position, according to one or more embodiments shown and described herein.

Referring to FIG. 1, an assembly line system 10 generally includes an elevated conveyor (denoted by element 12), such as an overhead conveyor, having a carrier 14 that hangs from a track 15 and that is used to convey a vehicle part 16 (e.g., a vehicle door assembly) in a conveying direction 18 for an assembly operation, such as applying service hole covers to the vehicle door assembly. As used herein, the term "elevated conveyor" refers to a conveyor that includes a track above the floor of an assembly location and a carrier that hangs from and moves along the track configured to carry parts. The conveyor 12 may include any number of support structures that can be used to support the vehicle part 16 on the carrier 14. In the illustrated example, the carrier 14 includes engagement members 20, 22 that extend downward from a lower support member 23.

A dolly apparatus 30 includes a base frame 32 having end frame members 34 and 36, top frame members 38 and bottom frame members 37 that extend between the end frame members 34 and 36. Wheels 41 and 43 may be provided that facilitate travel of the dolly apparatus 30 between locations. Only one side of the dolly apparatus 30 is shown and there may be another side with the same frame members and wheels forming a rectangular box-shape. While a rectangular box shape is shown, the base frame 32 may be any suitable shape and configuration depending on the assembly process the dolly apparatus is being used for and the area constraints around the assembly location. A parts support frame 40 is carried by the base frame 32 and includes a top 42 on which part bins 44 may be placed carrying parts for the assembly process. The part bins 44 may hold, for example, service hole covers for use in covering holes in the vehicle part 16.

Figure 2:
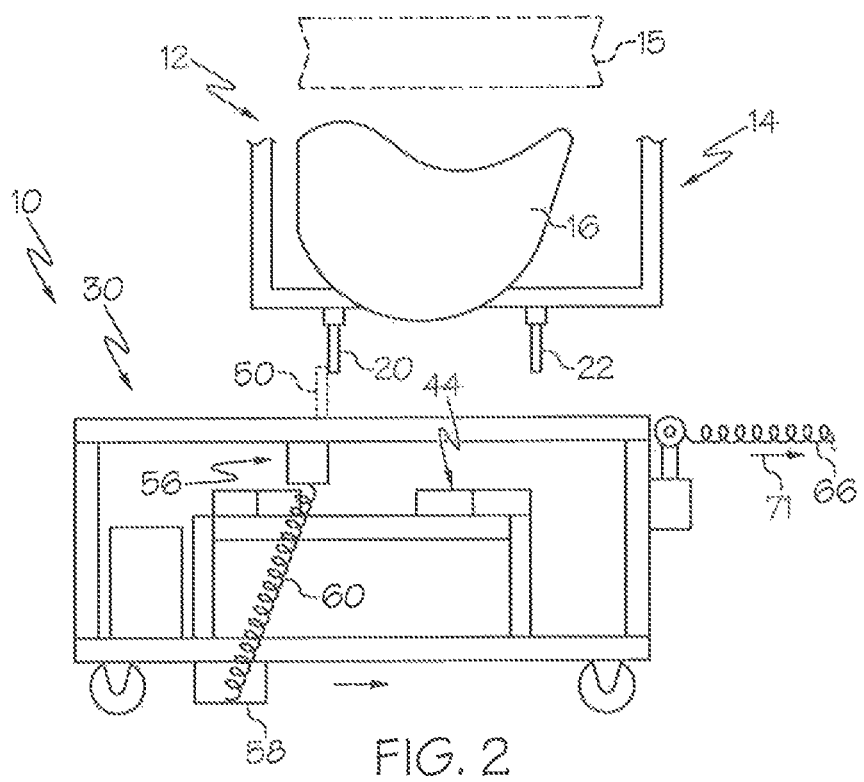
FIG. 2 is a diagrammatic view of the dolly support apparatus of FIG. 1 with the synchronization arm in a disengaged position, according to one or more embodiments shown and described herein.

A synchronization arm 50 is pivotally connected to the base frame 32 at the top frame members 38. The synchronization arm 50 pivots around a pivot location 54 between a raised, synchronization position (FIG. 1) and a lowered, disengaged position (FIG. 2). The synchronization arm 50 is connected to a linkage 56 that can be used to move the synchronization arm 50 between the synchronization position and the disengaged position. The linkage 56 may be connected to an actuation member, such as foot pedal 58, by a linking member 60, such as a cord, chain, rope, etc.

The dolly apparatus 30 may carry an assembly tool, such as a pneumatic drill 62 that is carried in a tool mount 64. A pneumatic hose 66 may provide pressurized air to the pneumatic drill 62 from a pressurized air source 68. The pneumatic hose 66 may have coils 70 that run between the pneumatic drill 62 and the pressurized air source 68. As described below, the pneumatic hose 66 can provide a biasing member that biases the dolly apparatus 30 toward an initial, upstream location as the dolly apparatus moves downstream in the conveying direction.

As shown in FIG. 1, when the synchronization arm 50 is in the synchronization position, it can engage one of the engagement members 20, 22 as the vehicle part 16 moves downstream in the conveying direction. In this initial location, the dolly apparatus 30 may be stationary until engaged with the engagement member 20, 22. When engaged with the engagement member 20, 22, the dolly apparatus 30 moves with the conveyor 12 as the vehicle part 16 is being conveyed toward an assembly location where an assembly operation is conducted.

Referring also to FIG. 2, as the dolly apparatus 30 moves downstream away from the pressurized air source 68, the pneumatic hose 66 becomes increasingly taut and provides a biasing force toward the initial location, as represented by arrow 71. The foot pedal 58 is linked to the synchronization arm 50 by the linkage 56 including the linking member 60 so that depressing the foot pedal 58 causes the synchronization arm 50 (represented in dashed lines in FIG. 2 to show its initial position) to pivot in the direction of arrow 72 downward to the disengaged position thereby disengaging the engagement member 20, 22. Once disengaged, the biasing force provided by the pneumatic hose 66 causes the dolly apparatus to roll upstream back toward the initial position. When the foot pedal 58 is released, it raises to its initial position, which causes the synchronization arm 50 to pivot back to the synchronization position as shown by FIG. 1, e.g., by gravity influence on the linkage 56 or due to another biasing force such as provided by a spring. The dolly apparatus 30 can then use the synchronization arm 50 to engage another engagement member 20, 22 of a following vehicle part 16 and the process can be repeated. In some embodiments, the dolly apparatus 30 may travel back to a part loading location where the part bins 44 can be replenished. In some embodiments, the dolly apparatus 30 may include a brake system that can be used to slow the dolly apparatus 30 as it returns to the initial location.

The above-described dolly apparatuses include a synchronization arm that can engage an elevated conveyor and travel with the conveyor without a need for an operator to push the dolly apparatus. A biasing force may be applied as the dolly apparatus travels downstream in the conveying direction so that one the synchronization arm is moved from the synchronization position to a disengaged position, the dolly apparatus returns to its initial location under the biasing force without the need for the operator to travel with the dolly apparatus. Such an automatic return arrangement can reduce or even eliminate walking time for the operator between assembly operations.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of automatically moving a dolly apparatus from an initial location to a downstream location, the method comprising:
    engaging a component being carried by along by an elevated conveyor with a synchronization arm of a dolly apparatus such that the dolly apparatus moving with the component, the dolly apparatus comprising:
      a base frame;
      a linkage movably mounted to the base frame; and
      a synchronization arm that is movably mounted to a top of the base frame, the linkage is operatively connected to the synchronization arm such that actuating the linkage lowers the synchronization arm to a disengaged position;
    actuating the linkage thereby lowering the synchronization arm to a disengaged position and releasing the component; and
    applying a biasing force to the dolly apparatus using a pneumatic hose as the dolly apparatus is moving with the component as the component is being conveyed downstream by the elevated conveyor, the biasing force biasing the dolly apparatus toward an initial location.

2. The method of claim 1 further comprising releasing the actuation member thereby raising the synchronization arm to a synchronization position to synchronize with another component being carried by the overhead conveyor.

3. The method of claim 1, wherein the pneumatic hose is connected to a pressurized air source.

4. The method of claim 1, wherein the component is a carrier that is operatively connected to a track, the carrier carrying a vehicle part.

5. The method of claim 4 further comprising performing an assembly operation on the vehicle part as the dolly apparatus moves.

6. The method of claim 1, wherein a foot pedal is operatively connected to the synchronization arm by the linkage.

7. The method of claim 6, wherein the foot pedal is operatively connected to the base frame.

8. A dolly apparatus for use on an assembly line, the dolly apparatus comprising:
- a base frame;
- a pedal movably mounted to the base frame;
- a synchronization arm that is movably mounted to a top of the base frame, the pedal is operatively connected to the synchronization arm such that actuating the pedal lowers the synchronization arm to a disengaged position and releasing the pedal raises the synchronization arm to a synchronization position to synchronize with an overhead conveyor; and
- a biasing member comprising a pneumatic hose that biases the dolly apparatus toward an initial location once the dolly apparatus is moved by the overhead conveyor.

9. The dolly apparatus of claim 8, wherein the pedal is operatively connected to the synchronization arm by a linkage.

10. The dolly apparatus of claim 9, wherein the pedal is a foot pedal operatively connected to the base frame.

\* \* \* \* \*